(12) United States Patent
Mackenzie et al.

(10) Patent No.: US 8,378,843 B2
(45) Date of Patent: Feb. 19, 2013

(54) SYSTEM AND METHOD TO PROVIDE VALUE ADDED SERVICES IN AN ASSET NETWORK

(75) Inventors: Patricia Denise Mackenzie, Clifton Park, NY (US); John William Carbone, Ballston Spa, NY (US); Charles Burton Theurer, Alplaus, NY (US); Joseph James Salvo, Schenectady, NY (US); Joseph Edward Jesson, Hamilton Square, NJ (US)

(73) Assignee: General Electric Company, Niskayuna, NY (US)

( * ) Notice: Subject to any disclaimer, the term of this patent is extended or adjusted under 35 U.S.C. 154(b) by 540 days.

(21) Appl. No.: 12/644,062

(22) Filed: Dec. 22, 2009

(65) Prior Publication Data
US 2011/0148657 A1 Jun. 23, 2011

(51) Int. Cl.
*G08C 19/16* (2006.01)
(52) U.S. Cl. .................. 340/870.01; 705/307; 370/328; 455/410; 455/419; 455/406; 455/506; 455/514; 342/29; 342/32; 342/50; 715/757; 340/686.1; 340/853.1; 340/572.1
(58) Field of Classification Search ............. 340/870.01, 340/686.1, 568.1, 539.1, 10.42, 572.1, 853.1; 705/307, 30, 35; 370/328; 455/410, 419, 455/406, 426.1, 514, 423, 506; 702/188; 715/757; 709/224; 706/47; 342/357.48, 342/22; 701/29.4, 32.3, 33.4, 50
See application file for complete search history.

(56) References Cited

U.S. PATENT DOCUMENTS

| | | | |
|---|---|---|---|
| 6,253,064 B1 * | 6/2001 | Monroe | 455/66.1 |
| 6,724,316 B2 * | 4/2004 | Addy et al. | 340/686.1 |
| 7,482,973 B2 * | 1/2009 | Tucker et al. | 342/357.48 |
| 7,489,993 B2 | 2/2009 | Coffee et al. | |
| 7,554,441 B2 * | 6/2009 | Viegers et al. | 340/539.22 |
| 7,558,564 B2 * | 7/2009 | Wesby | 455/419 |
| 7,594,889 B2 * | 9/2009 | St. Ores et al. | 600/301 |
| 7,783,507 B2 * | 8/2010 | Schick et al. | 705/7.11 |
| 8,166,157 B2 * | 4/2012 | Couture et al. | 709/224 |
| 8,180,336 B2 * | 5/2012 | Wesby | 455/419 |
| 2005/0171876 A1 | 8/2005 | Golden | |
| 2006/0166644 A1 | 7/2006 | Champion | |
| 2008/0106406 A1 | 5/2008 | Yoo et al. | |
| 2009/0140872 A1 * | 6/2009 | O'Neal et al. | 340/679 |
| 2009/0287500 A1 * | 11/2009 | Benjamin et al. | 705/2 |
| 2010/0318487 A1 * | 12/2010 | Marvasti | 706/47 |
| 2011/0246067 A1 | 10/2011 | Markham et al. | |

FOREIGN PATENT DOCUMENTS

JP     2002351927 A     12/2002

OTHER PUBLICATIONS

Bard Fjukstad; Abstract : Super sensor network; Munin: Super sensor network; URI: http://hdl.handle.net/10037/1445, Appears in Collection: Mastergradsoppgaver i informatikk; Publisher: University of Troms; Date: May 15, 2008; 1 Page. Kevin Maney; Drivers of tomorrow won't get mad at traffic, they'll get around it; retrieved from the Internet: URL: http://www.usatoday.com/money/industries/technology/maney/2006-09-26-traffic-tech_x.htm, [online] retrieved Sep. 27, 2012.

* cited by examiner

*Primary Examiner* — Lam T Mai
(74) *Attorney, Agent, or Firm* — Scott J. Asmus (57) ABSTRACT

A telematics system in an asset network is provided. The telematics system includes one or more sensors configured to acquire data from multiple assets at different locations in the asset network. The telematics system also includes a transceiver configured to receive the data acquired from the one or more sensors. The telematics system further includes a data analysis system. The data analysis system includes a central data server configured to receive the data transmitted from the transceiver. The data analysis system also includes a processing circuitry configured to combine data, analyze combined data to detect trends, generate value added services based on the detected trends and distribute the value added services to multiple end users.

30 Claims, 10 Drawing Sheets

SYSTEM AND METHOD TO PROVIDE VALUE ADDED SERVICES IN AN ASSET NETWORK

BACKGROUND

The invention relates generally to a system and method for providing value added services and more particularly, the invention relates to a system and method for providing value added services in an asset network.

Conventional asset networks employ a telematics system to provide real time data about an asset in an asset network. Such telematics systems include multiple sensors disposed on the assets to acquire different kinds of data related to the asset. The multiple sensors transmit the acquired data to a data analysis system via a hub attached to the asset. Typically, the data analysis system receives real time data about the asset such as, but not limited to, location, speed, loading/unloading, tire pressure and driving pattern via respective sensors. Furthermore, the data analysis system monitors the real time data and provides an alarm signal in case of any discrepancies. However, the conventional telematics system is unable to collect data related to the location at which location the asset is disposed. Furthermore, the data analysis system employed in the conventional telematics systems is unable to fuse unrelated data and identify patterns in the fused data.

In addition, the data analysis system is incapable to provide real time information about the different conditions prevailing in the location. Furthermore, the data analysis system is unable to provide justifications and possible predicted solutions in case of sudden changes in the commonly prevailing conditions.

Therefore, there is a need for an improved telematics system in an asset network that addresses one or more aforementioned issues.

BRIEF DESCRIPTION

In accordance with an embodiment of the invention, a processing circuitry is provided in an asset network. The processing circuitry is configured to combine data from multiple assets at different locations in the asset network. The processing circuitry also analyzes combined data to detect trends in the asset network. The processing circuitry further generates value added services based on the detected trends. The processing circuitry is also configured to distribute the value added services to multiple end users in the asset network.

In accordance with another embodiment of the invention, a telematics system in an asset network is provided. The telematics system includes multiple sensors configured to acquire data from multiple assets at different locations in the asset network. The telematics system also includes a transceiver configured to receive the data acquired from the multiple sensors. The telematics system further includes a data analysis system. The data analysis system includes a central data server configured to receive the data transmitted from the transceiver. The data analysis system also includes a processing circuitry configured to combine data from multiple assets at different locations in the asset network. The processing circuitry also analyzes combined data to detect trends in the asset network. The processing circuitry further generates value added services based on the detected trends. The processing circuitry is also configured to distribute the value added services to multiple end users in the asset network.

In accordance with yet another embodiment of the invention, a method of providing a telematics system in an asset network is provided. The method includes providing multiple sensors configured to acquire data from multiple assets at different locations in the asset network. The method also includes providing a transceiver configured to receive the data acquired from the multiple sensors. The method further includes providing a central data server configured to receive the data transmitted from the transceiver. The method also includes providing a processing circuitry configured to combine data from multiple assets at different locations in the asset network. The processing circuitry also analyzes combined data to detect trends in the asset network. The processing circuitry further generates value added services based on the detected trends. The processing circuitry is also configured to distribute the value added services to multiple end users in the asset network.

In accordance with another embodiment of the invention, a method for data analysis in an asset network is provided. The method includes acquiring data from multiple sensors in the asset network. The method also includes combining the data acquired from the multiple sensors. The method further includes analyzing a combined data to detect trends in the asset network. The method also includes generating value added services based on the detected trends.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include an improved telematics system employed in an asset network that includes multiple sensors configured to acquire data from multiple assets at different locations in the asset network and an enhanced data analysis system. The enhanced data analysis system includes a central data server configured to receive the data transmitted from the transceiver and a processing circuitry configured to combine the data received from the central server, analyze combined data to detect trends in the asset network, generate value added services based on the detected trends and distribute the value added services to multiple end users.

With recent improvements and cost reductions in GPS technology and wireless communication, telematics systems that integrate wireless communications with sensor-based monitoring and location-aware applications have been widely deployed for mobile asset tracking and condition monitoring. Such telematics systems have a huge potential to acquire useful data from different remote locations. Several kinds of sensors may be mounted on the mobile assets to acquire diverse data from a particular location depending upon a requirement of an end user. A conventional telematics system includes multiple assets disposed at different locations. The multiple assets are mounted with multiple sensors to acquire diverse data and transmit the data to a data analysis system via a remote hub. Furthermore, the conventional telematics system is described in detail with reference to FIG. 1 below.

Figure 1:
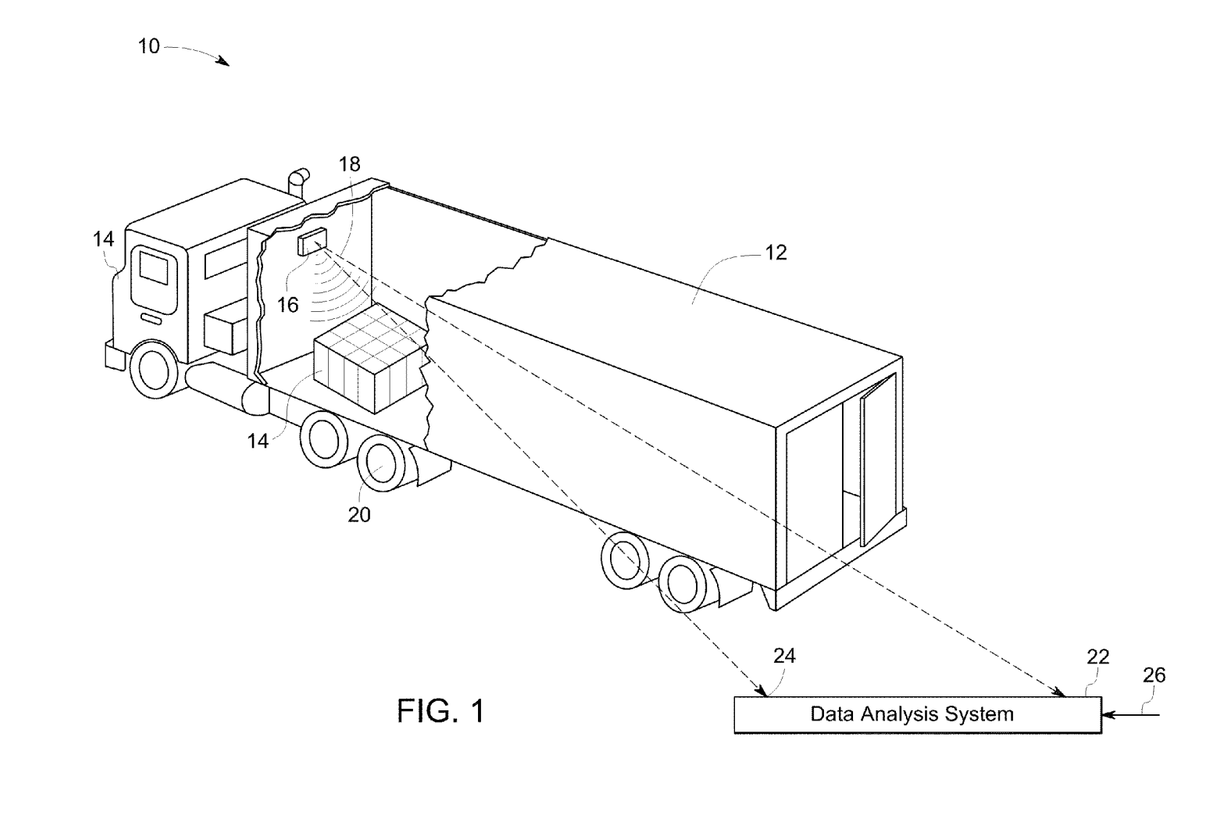
FIG. 1 is a schematic illustration of a conventional telematics system employed in an asset network.

Referring to FIG. 1, the conventional exemplary telematics system 10 includes a trailer 12 and a cab 14 attached to a front end of the trailer 12 having a driver. A remote hub 16 is located in the trailer 12. The remote hub 16 is configured to receive data 18 from multiple sensors 20 mounted on the trailer 12. In an example, the multiple sensors 20 include speed sensors, braking sensors, tire pressure sensors, cargo sensors and location sensors. The remote hub 16 further transmits the data 18 to a data analysis system 22. The data analysis system 22 receives the data 18 and monitors the trailer 12 and the cab 14 based on a received data 24. The data analysis system 22 compares the received data 24 with a preset data 26 in the data analysis system 22 and initiates an alarm signal in case of any discrepancies in the received data 24.

Furthermore, typical data analysis system 22 is employed to monitor asset utilization, efficiency, mileage, location and identify backhauling opportunities from data 24 received from the multiple sensors 20 that are preexisting in the conventional telematics system 10. However, the received data 24 may be utilized in several additional ways to provide different value added services via nurturing the seamlessly unlimited potential of the telematics system in an asset network. One such improved telematics system disposed in the asset network is described below in FIG. 2.

Figure 2:
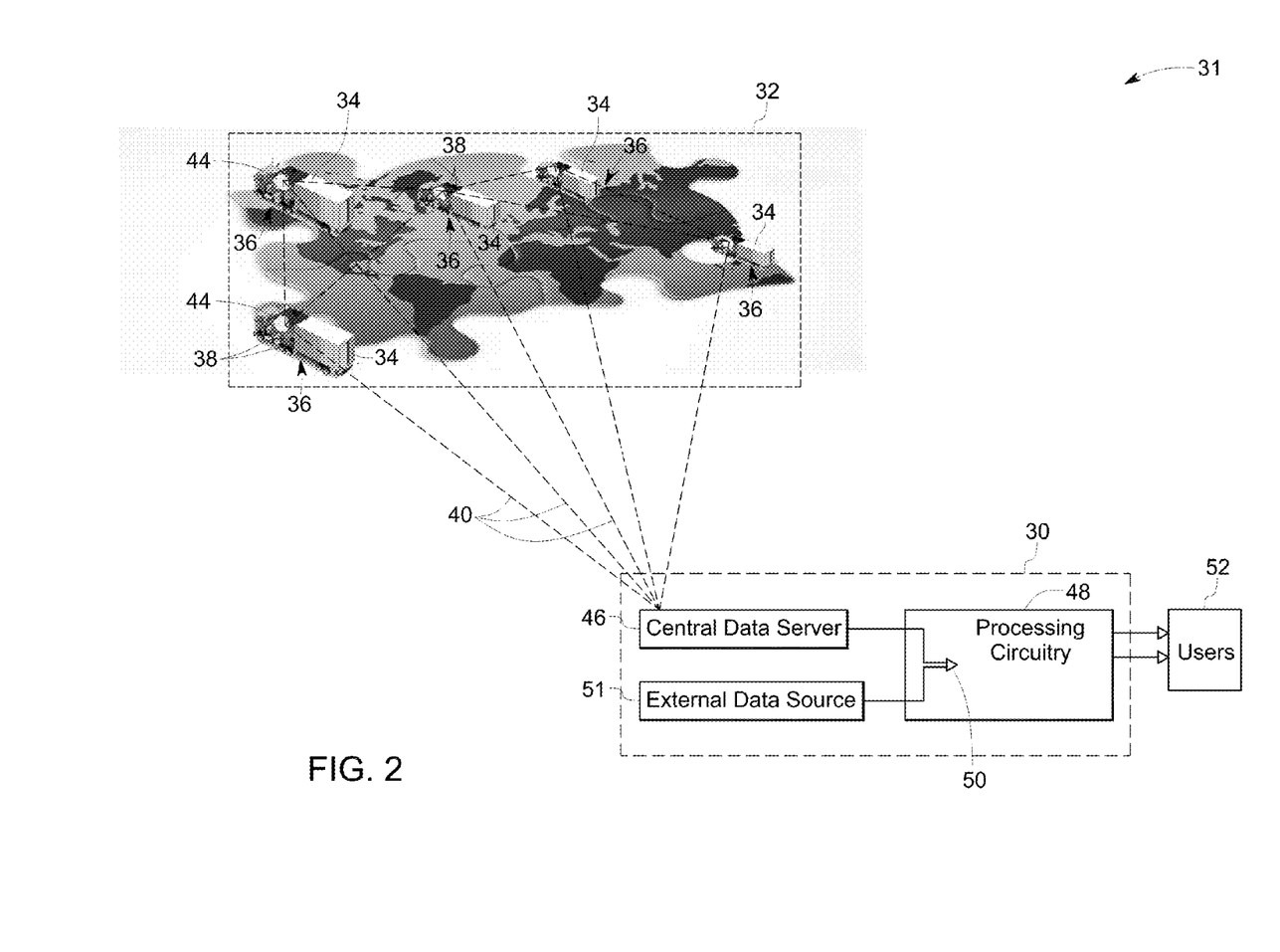
FIG. 2 is a schematic illustration of a telematics system employing a data analysis system in an asset network in accordance with an embodiment of the invention.

FIG. 2 is a schematic illustration of a telematics system 31 employing a data analysis system in an asset network in accordance with an embodiment of the invention. The asset network 32 includes multiple assets 34 dispersed at different remote locations 36. In an embodiment of the invention, assets 34 include a moving vehicle. A non-limiting example of the moving vehicle may include a tractor trailer. The multiple assets 34 include multiple sensors 38 disposed on the multiple assets 34 that acquire data 40 from respective locations 36 and transmit the acquired data 40 to the data analysis system 30 at a distant location via a transceiver 44. In one embodiment of the invention, the transceiver 44 is the remote hub 16 of FIG. 1. In another embodiment of the invention, the data acquired from the multiple sensors 38 may be different from the acquired data 40 transmitted to the data analysis system 30 at the distant location via the transceiver 44. The data analysis system 30 includes a central data server 46 configured to receive the acquired data 40. The central data server 46 transfers the acquired data 40 to a processing circuitry 48. The processing circuitry 48 combines the acquired data 40 from the multiple assets 34 resulting in a combined data 50. In a particular embodiment, the processing circuitry 48 combines the acquired data 40 from multiple assets 34 with a data from an external data source 51. The processing circuitry 48 analyzes the combined data 50 to detect trends in the asset network 32. In an embodiment of the invention, the trends may include traffic congestion, road infrastructure, pollen count at a particular location, weather conditions and radiation detection. The processing circuitry 48 generates multiple value added services based on the detected trends. In another embodiment of the invention, value added services may include environmental reports, road infrastructure status and conditions, traffic congestion reports at the different locations, commerce patterns, amenities and preferences. Furthermore, the processing circuitry 48 distributes the value added services to multiple end users 52 in the asset network 32 for commercial benefits.

It should be noted that embodiments of the invention are not limited to any particular processing circuitry for performing the processing tasks of the invention. The term "processing circuitry," as that term is used herein, is intended to denote any machine capable of performing the calculations, or computations, necessary to perform the tasks of the invention. The term "processing circuitry" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 3:
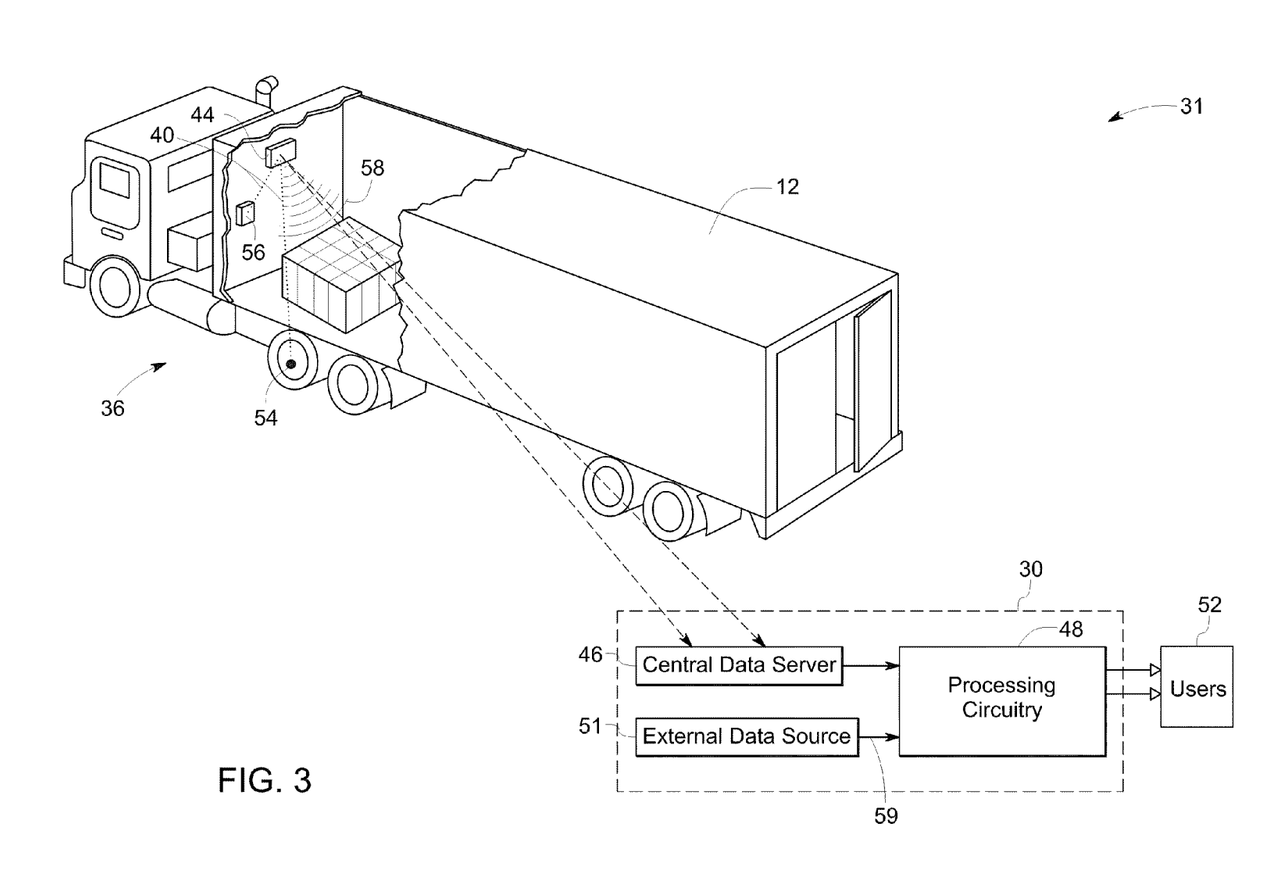
FIG. 3 is a schematic illustration of communication between an exemplary data analysis system employed in an exemplary tractor-trailer of the asset network and the data analysis system of FIG. 2.

FIG. 3 is a schematic illustration of the telematics system 31 depicting communication between an exemplary data analysis system employed in an exemplary tractor-trailer of the asset network and the data analysis system of FIG. 2. The multiple sensors 38 (FIG. 2) not seen in FIG. 3 mounted on the trailer 12 (FIG. 1) are configured to acquire data 40 from different locations 36. In an exemplary embodiment, the multiple sensors 38 (FIG. 2) not seen in FIG. 3 include one or more preexisting sensors 54 and one or more selective sensors 56. As used herein, the term one or more selective sensors 56 are provided to perform specific functions. In a non limiting example, the one or more selective sensors 56 include radiation sensors, weather sensors and pollen sensors that acquire data 40 related to radiation level, weather conditions and pollen count at a particular location respectively. In another embodiment, the one or more preexisting sensors 54 include tire pressure sensors, braking sensors and speed sensors that acquire data 40 related to tire pressure, application of brakes, halt and speed of the trailer 12 respectively. The multiple sensors 38 (FIG. 2) transmit the acquired data 40 to a transceiver 44 mounted on the trailer 12. Furthermore, the transceiver 44 transmits the acquired data 40 via wireless signals 58 to the central data server 46. Although, for simplicity of understanding communication between a single tractor-trailer in the asset network and the data analysis system is shown, the data 40 is acquired from different locations 36 via the multiple sensors 38 mounted on the multiple assets 34 in the asset network 32 and is transmitted to the central data server 46 via the transceiver 44 mounted on each asset respectively. Non-limiting examples of transmitting the wireless signals 58 include cellular, satellite, Zigbee, Bluetooth or WiFi communication. One example of such a transceiver 44 is a VeriWise™ transceiver, produced by the General Electric Company. In another embodiment of the invention, the data acquired from the multiple sensors 38 may be different from the acquired data 40 transmitted to the central data server 46 at the distant location via the transceiver 44. The central data server 46 is coupled to the processing circuitry 48 that generates and distributes the value added services to the end users 52 for commercial benefits. Furthermore, different value added services may be generated based on specific requirements of the end users 52. In an embodiment of the invention, value added services are generated by combining the data 40 acquired by the one or more preexisting sensors 54, one or more selective sensors 56 or a combination thereof. In another embodiment of the invention, the value added services are generated via combining the data 40 with an external data 59 from an external data source 51. The generation of different value added services via the processing circuitry 48 is described in greater detail with respect to FIGS. 4-6.

Figure 4:
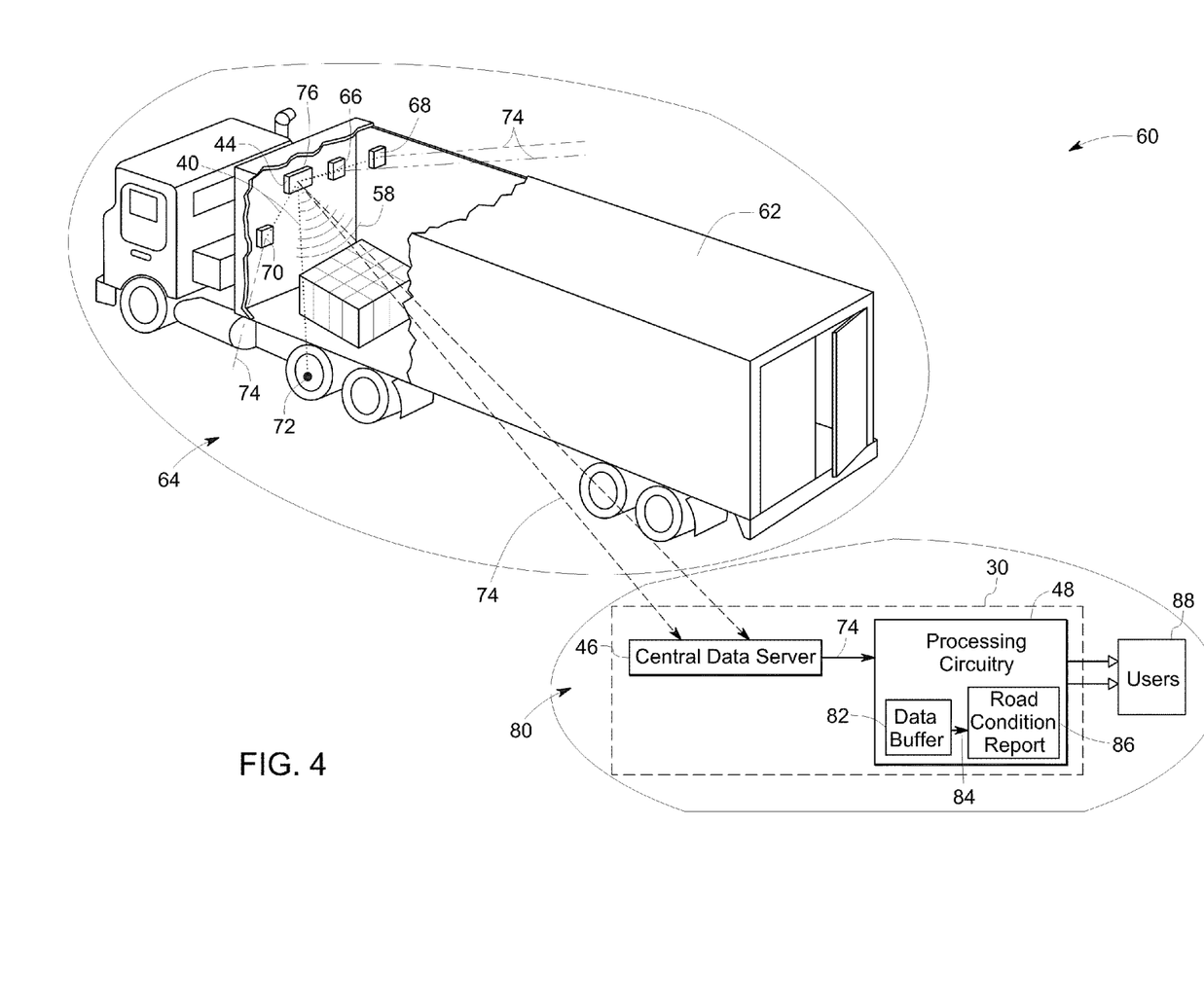
FIG. 4 is a schematic illustration of an exemplary data analysis system generating a road condition report in the telematics system in FIG. 3 in accordance with an embodiment of the invention.

FIG. 4 is a schematic illustration of a telematics system 60 depicting an exemplary data analysis system generating a road condition report in the telematics system in FIG. 3 in accordance with an embodiment of the invention. A trailer 62 is at a location 64 and is mounted with one or more preexisting sensors (FIG. 3) equivalent to sensors of FIG. 3 such as a temperature sensor 66, humidity sensor 68, location sensor 70 and ABS braking sensor 72 that acquire data 74 related to the temperature, humidity, location and application of brakes respectively. The acquired data 74 is transmitted to a transceiver 76. The transceiver 76 further transmits the acquired data 74 to the data analysis system 30 (FIG. 3). Although, for simplicity of understanding communication between a single trailer 62 in the asset network and the data analysis system 30 is shown, the data 74 is acquired from different locations 36 via the temperature sensor 66, humidity sensor 68, location sensor 70 and ABS braking sensor 72 mounted on the multiple assets 34 in the asset network and is transmitted to the central data server 46 via the transceiver 76 mounted on each asset respectively. The data analysis system 30 is disposed at a remote location 80. Furthermore, the data analysis system 30 includes the central data server 46 (FIG. 3), which central data server 46 sends the acquired data 74 to the processing circuitry 48 (FIG. 3) that combines and analyzes the acquired data 74 to detect trends.

The processing circuitry 48 combines the acquired data 74 received from the temperature sensor 66, the humidity sensor 68, the location sensor 70 and the ABS braking sensor 72 via a data buffer 82 resulting in a combined data 84. The processing circuitry 48 analyzes the combined data 84 to detect trends such as variations in the temperature and humidity at the location 64 and the application of brakes.

In the present example, the trends show that the temperature and humidity are low at the location 64 and also the brakes are employed frequently. The processing circuitry 48 generates a road condition report 86 providing real time details of road conditions at the location 64 such as the road is blocked and may be covered with snow. The road condition report 86 is distributed to users 88 such as trailer fleet managers and individual drivers for commercial benefits. Therefore, the users 88 can plan their trips and routes for the trips accordingly. Additionally, one or more selective sensors are mounted on the trailer 62 to analyze specific data and provide specific reports. The generation of selective reports with the help of one or more selective sensors will be described in detail with reference to FIG. 5 and FIG. 6.

Figure 5:
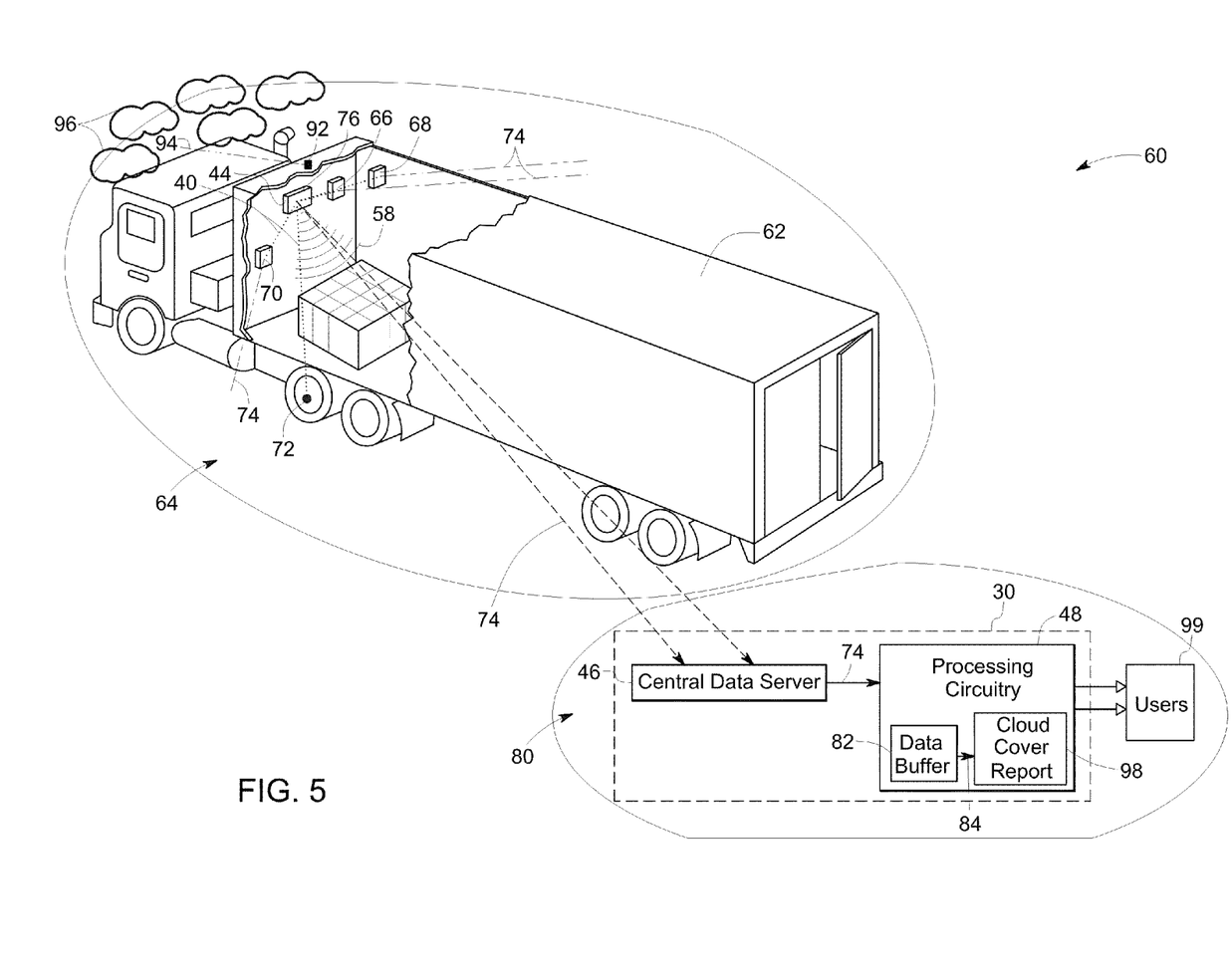
FIG. 5 is a schematic illustration of an exemplary data analysis system generating a report employed in a telematics system including a cloud cover sensor in accordance with an embodiment of the invention.

FIG. 5 is a schematic illustration of the telematics system 60 depicting an exemplary data analysis system generating a report employed in a telematics system including a cloud cover sensor in accordance with an embodiment of the invention. A cloud cover sensor 92 is disposed on the trailer 62 (FIG. 4). The one or more preexisting sensors 54 equivalent to sensors 54 (FIG. 3) such as the temperature sensor 66, humidity sensor 68, location sensor 70 and ABS braking sensor 72 are also mounted on the trailer 62 and acquire data 74 (FIG. 4) and transmit the data 74 to a central data server 46 (FIG. 2) via the transceiver 76 (FIG. 4) as described above in FIG. 4. The cloud cover sensor 92 acquires data 94 related to presence of clouds 96 in the sky at a location 64 and transmits the data 94 to the central data server 46. The data 94 acquired by the cloud cover sensor 92 is combined with the data 74 in the data buffer 82 by the processing circuitry 48 (FIG. 2) to generate a report 98 that provides details about the cloud cover at the location 64 (FIG. 4). The report 98 may be useful to customers 99 working in the field of solar power generation since it would enable them predict amount of solar energy to be generated in such location 64 of cloud cover. In an embodiment of the invention, the report 98 may be useful for farmers and users planning a picnic.

Figure 6:
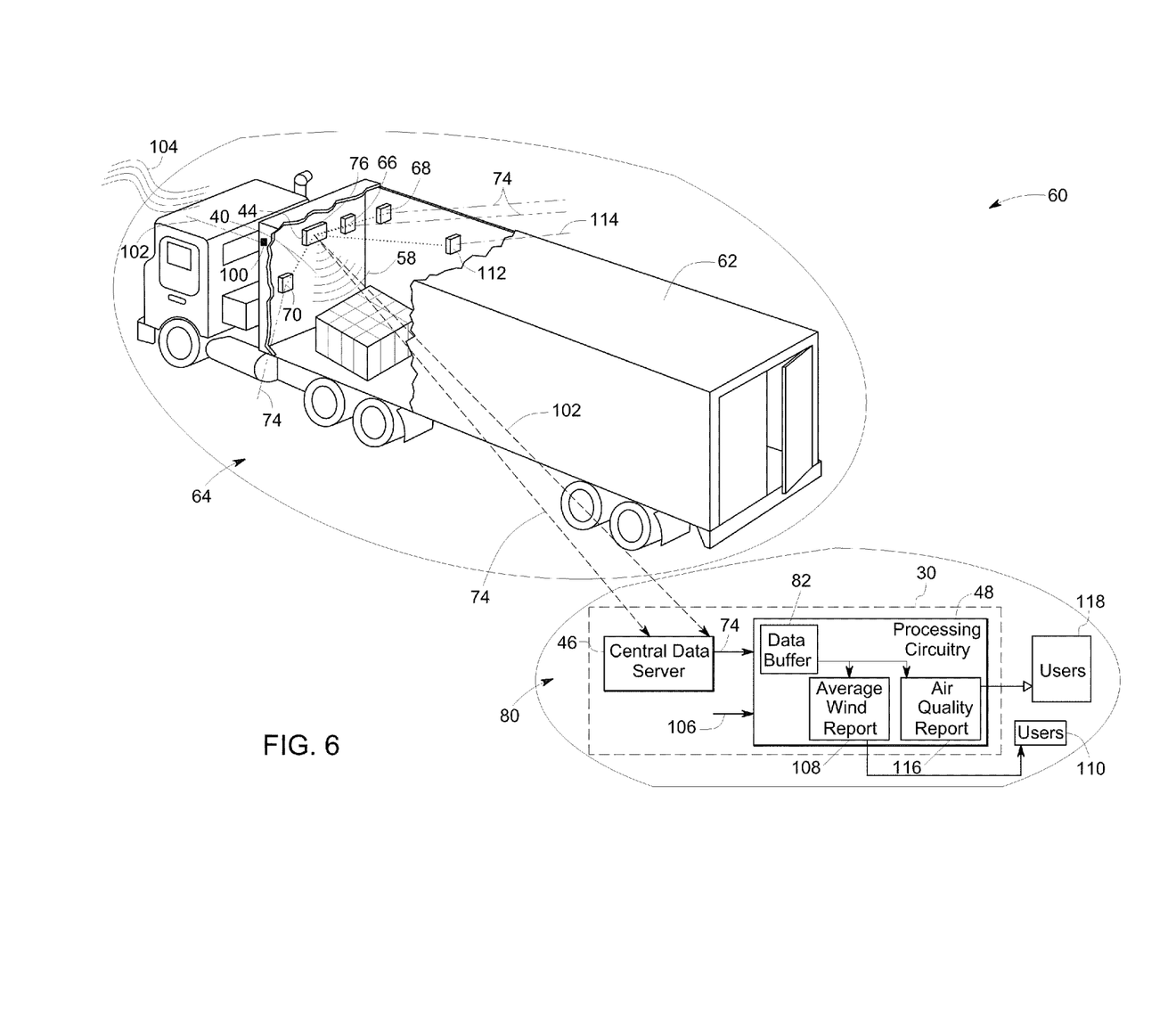
FIG. 6 is a schematic illustration of another exemplary data analysis system generating a pollen count report in accordance with an embodiment of the invention.

FIG. 6 is a schematic illustration of the telematics system 60 depicting another exemplary data analysis system generating a pollen count report in accordance with an embodiment of the invention. A wind speed sensor 100 is mounted on the trailer 62 (FIG. 4) at the location 64 (FIG. 4). The wind speed sensor 100 acquires data 102 about speed of wind 104 at the location 64. The data 102 acquired by the wind speed sensor 100 is sent to the central data server 46 via a transceiver 76 (FIG. 4). The one or more preexisting sensors 54 equivalent to sensors 54 (FIG. 3) such as the temperature sensor 66, humidity sensor 68, location sensor 70 and ABS braking sensor 72 are also mounted on the trailer 62 and acquire data 74 (FIG. 4) and transmit the data 74 to a central data server 46 (FIG. 2) via the transceiver 76 (FIG. 4) as described above in FIG. 4. The processing circuitry 48 (FIG. 2) combines the wind speed data 102 with the data 74 of the location sensor 70 and a historic data 106 to generate a report 108 providing details about directions and average speed of wind at the location 64. The report 108 is distributed to users 110 interested in wind energy. In addition, pollen sensor 112 acquires data 114 of pollen content in the air at the location 64. The acquired data 114 is combined with the data 74 acquired by the humidity sensor 68 (FIG. 3) to generate an air quality report 116 that includes a description of composition of air at the location 64 that may be used by users 118 for purposes of geological and environmental studies.

Figure 7:
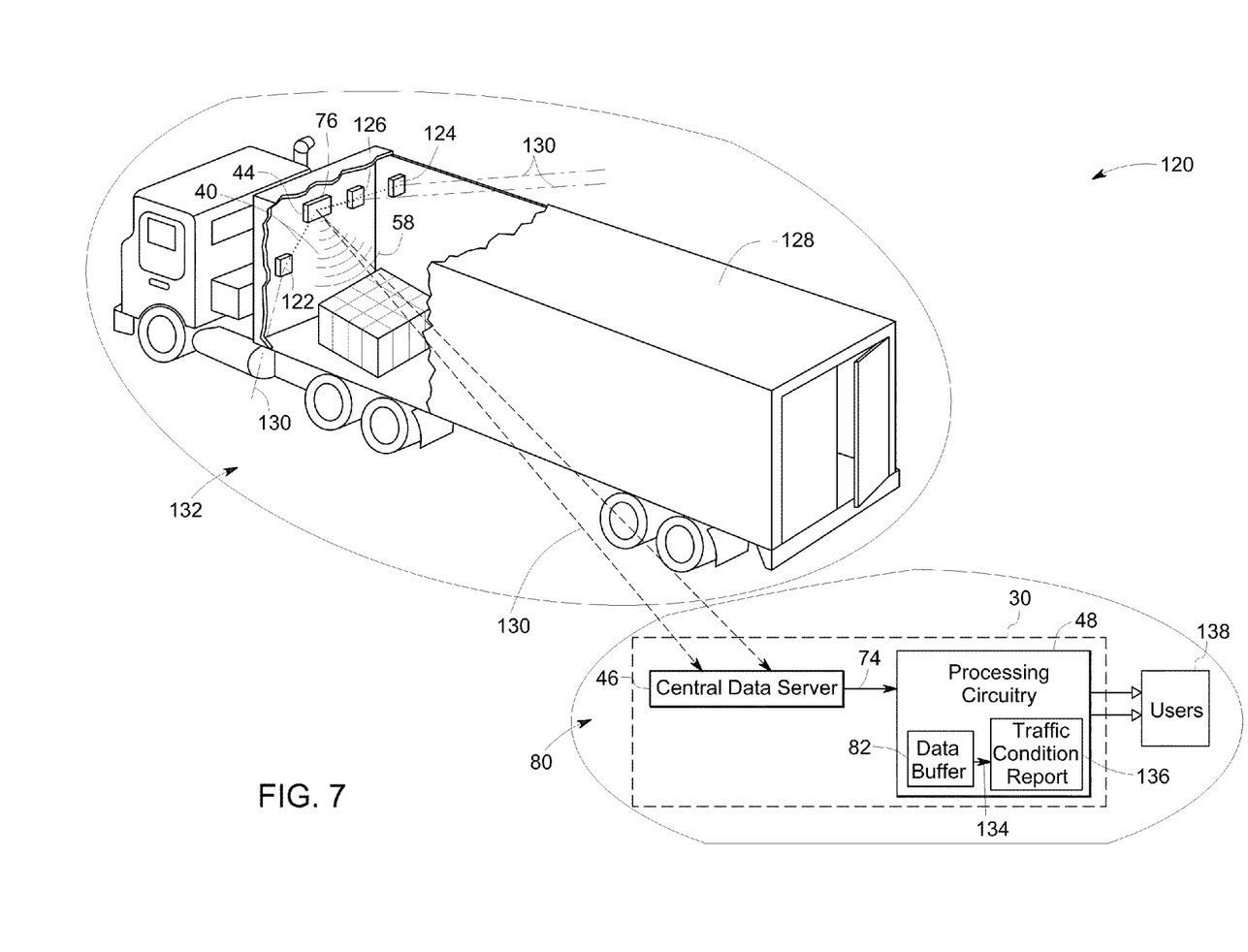
FIG. 7 is a schematic illustration of another exemplary data analysis system generating a traffic condition report in accordance with an embodiment of the invention.

FIG. 7 is a schematic illustration of a telematics system 120 depicting another exemplary data analysis system generating a traffic condition report in accordance with an embodiment of the invention. One or more preexisting sensors (equivalent to sensors 54 in FIG. 3) such as a speed sensor 122, location sensor 124 and ABS braking sensor 126 are disposed on the trailer 128 for acquiring data 130 related to the speed, location and application of brakes at a location 132 respectively. The processing circuitry 48 (FIG. 3) combines the acquired data 130 received from the speed sensor 122, the location sensor 124 and the ABS braking sensor 126 via the data buffer 82 resulting in a combined data 134. The processing circuitry 48 analyzes the combined data 134 to detect trends such as variations in the speed at the location 132 detected by the location sensor 124 and the application of brakes at the location 132.

In the present example, the trends show that the speed is slow for a significant period of time at the location 132 with frequent application of brakes. The processing circuitry 48 generates a traffic condition report 136 providing real time details of the traffic conditions at the location 132 such as a particular road at the location 132 has heavy traffic or the roads are wet and slippery and provides an alternative route for travel. The traffic condition report 136 is distributed to the users 138 such as trailer fleet managers and individual drivers for a fee. Therefore, the users 138 may plan their trips and routes for the trips accordingly.

Figure 8:
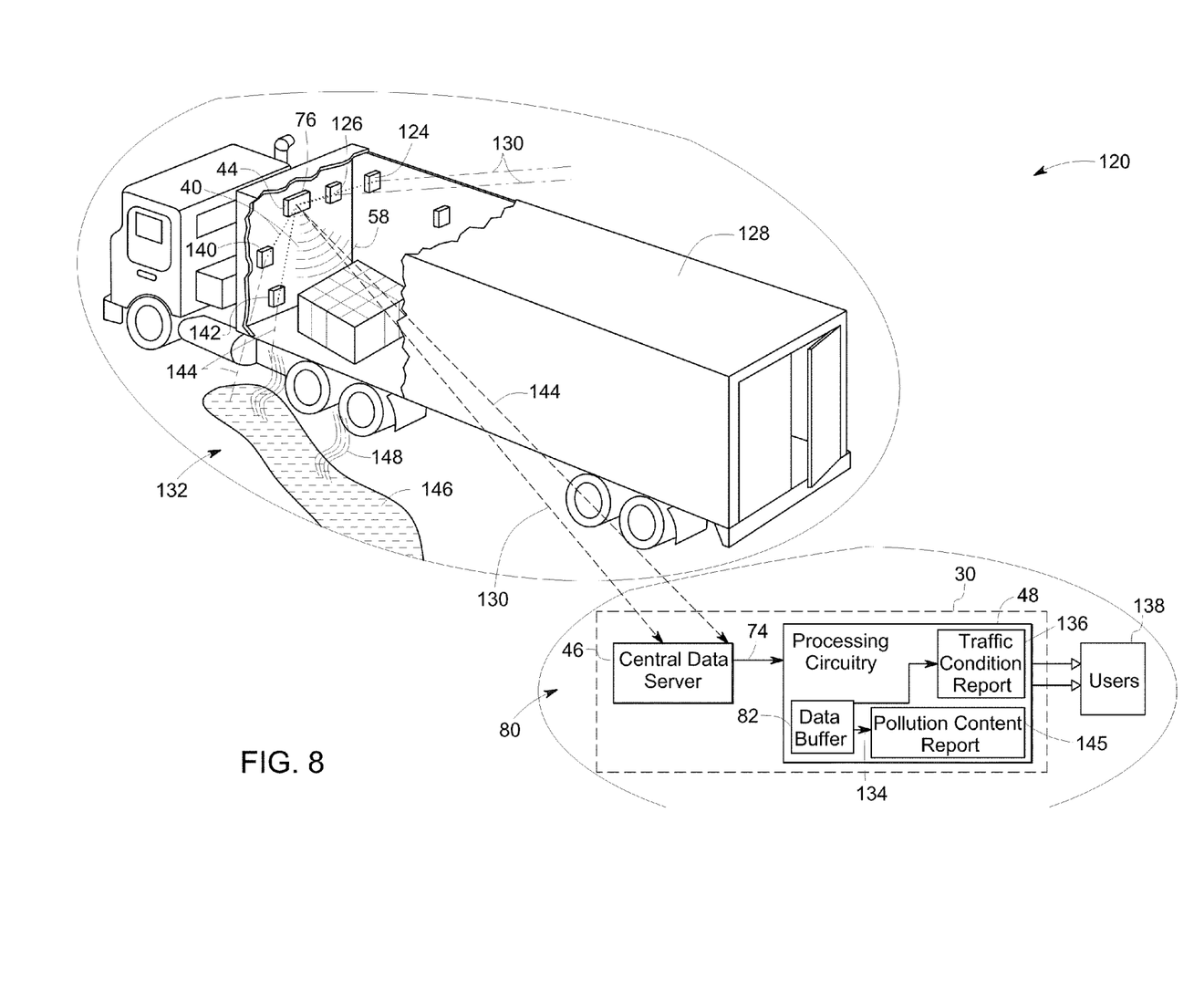
FIG. 8 is a schematic illustration of another exemplary data analysis system generating a pollution content report at a particular location in accordance with an embodiment of the invention.

FIG. 8 is a schematic illustration of the telematics system 120 depicting another exemplary data analysis system generating a pollution content report at a particular location in accordance with an embodiment of the invention. One or more preexisting sensors (equivalent to sensors 54 in FIG. 3) such as the location sensor 124 and ABS braking sensor 126 are disposed on the trailer 128 for acquiring data 130 related to the speed, location and application of brakes at a location 132 respectively. In particular situations of any disaster the traffic condition reports 136 (FIG. 7) are employed to detect traffic patterns in the location 132 to determine evacuation, relief effort and other disaster response obstacles. In addition, one or more sensors such as, pollution sensors 140 and radiation sensors 142 are provided on the trailer 128 to acquire data 144 related to pollution level and radiation content in the disaster affected location 132. In an embodiment of the invention, the acquired data 144 is combined with the data acquired by the location sensor 124 and analyzed to generate a pollution content report 145 of a location 132. In another embodiment of the invention, the acquired data 144 is combined with the data 130 (FIG. 7) and analyzed for mapping a chemical release dispersion 146 plume in the location 132 causing radiation 148.

Figure 9:
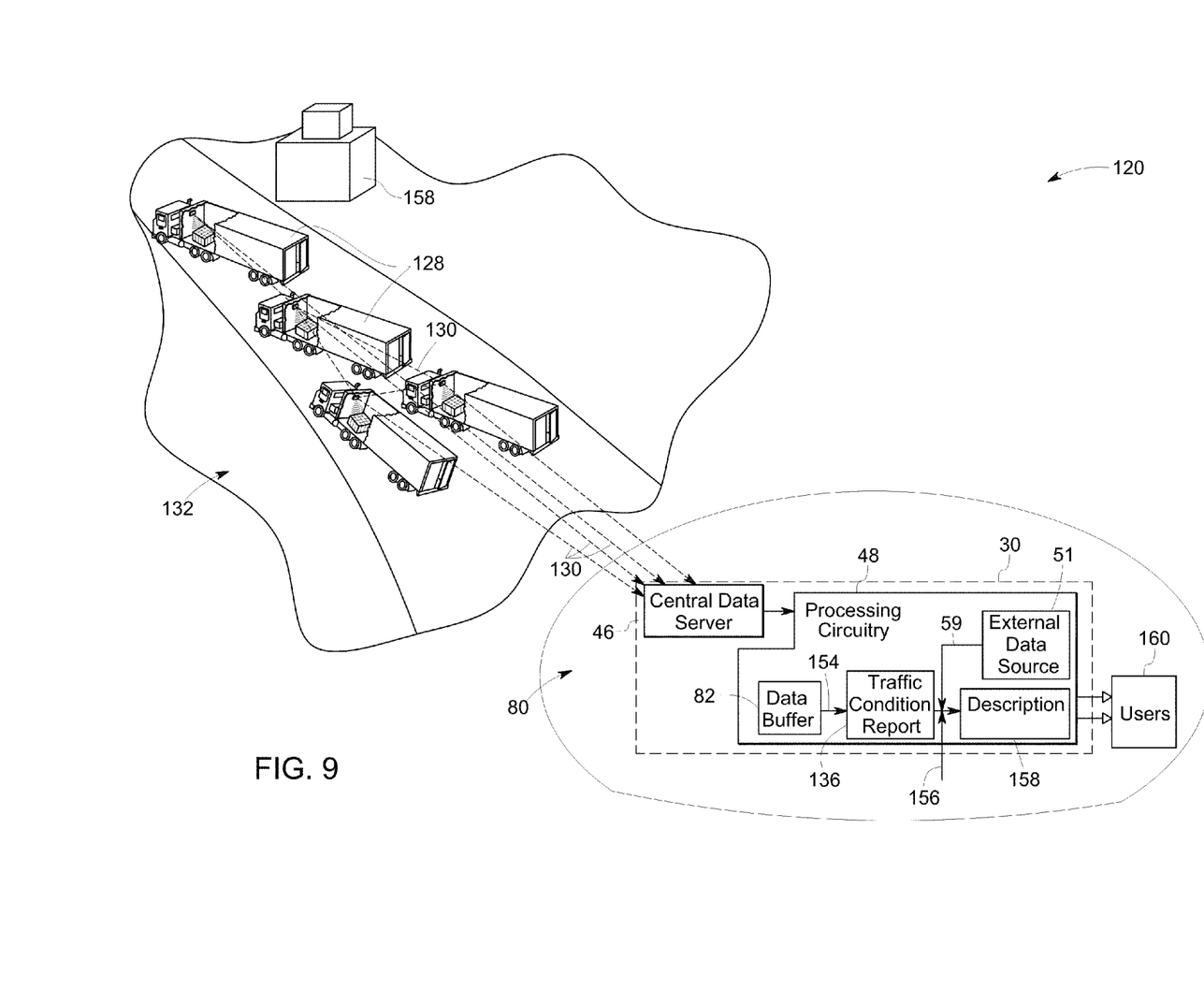
FIG. 9 is a schematic illustration of another exemplary data analysis system generating a traffic condition report utilizing an external data source in accordance with an embodiment of the invention.

FIG. 9 is a schematic illustration of the telematics system 120 depicting another exemplary data analysis system generating a traffic condition report utilizing an external data source in accordance with an embodiment of the invention. The acquired data 130 (FIG. 7) is combined at the data buffer 82 to form a combined data 154. The combined data 154 is analyzed by comparing the combined data 154 to a historic data 156 to detect abrupt changes in trends such as sudden increase in traffic conditions at the location 132. Furthermore, the external data 59 (FIG. 3) from an external data source 51 (FIG. 2) is analyzed with reference to the combined data 154 and provides reasons and possible predicted solutions for such changes.

An example of such an abrupt change in trends would be due to a sale in a supermarket 158 on a weekend generated from the external data source 51. The processing circuitry 48 (FIG. 3) analyzes the combined data 134 (FIG. 7) and provides that the location 132 has heavy traffic in the traffic condition report 136. The processing circuitry 48 compares the traffic condition report 136 with the historic data 156 and detects sudden changes in the past trends. Furthermore, the processing circuitry 48 combines the acquired data 130 and the data 59 from the external data source 51 (FIG. 2) to generate a description 158 of the reason for the sudden change in the traffic condition trends and the possible predicted solution such as an alternative route or a closing time of the supermarket. The processing circuitry 48 further distributes the description 158 and the report 136 to the users 160. The method for generating the description 158 and report 136 by the processing circuitry 48 will be described in greater detail with respect to FIG. 10.

Figure 10:
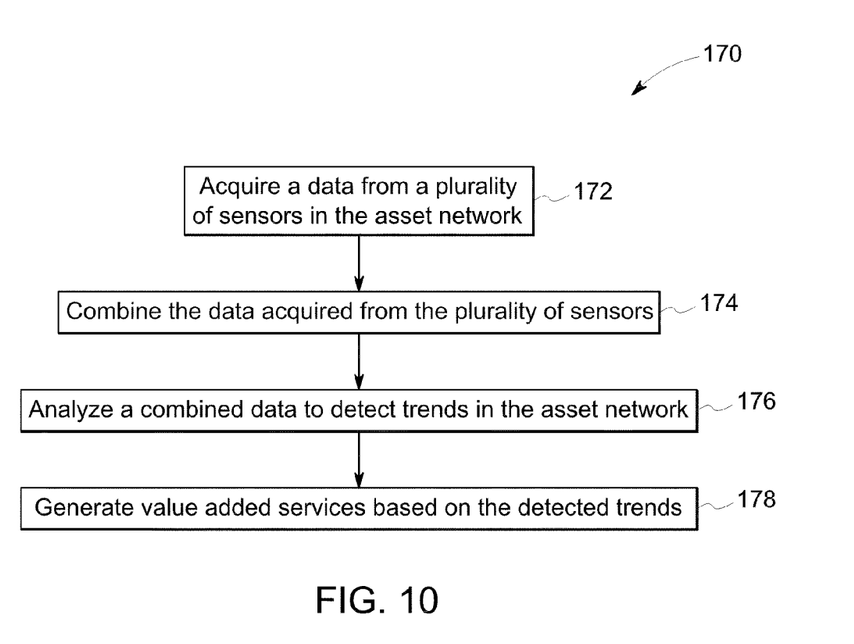
FIG. 10 is a flow chart representing steps involved in a method for data analysis in an asset network in accordance with an embodiment of the invention.

FIG. 10 is a flow chart representing steps involved in an exemplary method 170 for data analysis via a processing circuitry of FIG. 3 in accordance with an embodiment of the invention. The method 170 includes acquiring data from multiple sensors in an asset network in step 172. In an embodiment of the invention, the data is transmitted to a central data server via a transceiver. Furthermore, the transceiver transmits the data to a processing circuitry. The data acquired from the multiple sensors is combined in step 174. In an embodiment of the invention, the data acquired from the multiple sensors is combined with a data provided via an external data source. A combined data is analyzed to detect trends in the asset network in step 176. Furthermore, value added services are generated based on the detected trends in step 178. The value added services are distributed to multiple end users in an asset network. In one embodiment of the invention, the distribution is done via wireless communication. In another embodiment of the invention, the wireless communication includes satellite communication, WiFi access point, cellular tower or other fixed wireless nodes.

Figure 11:
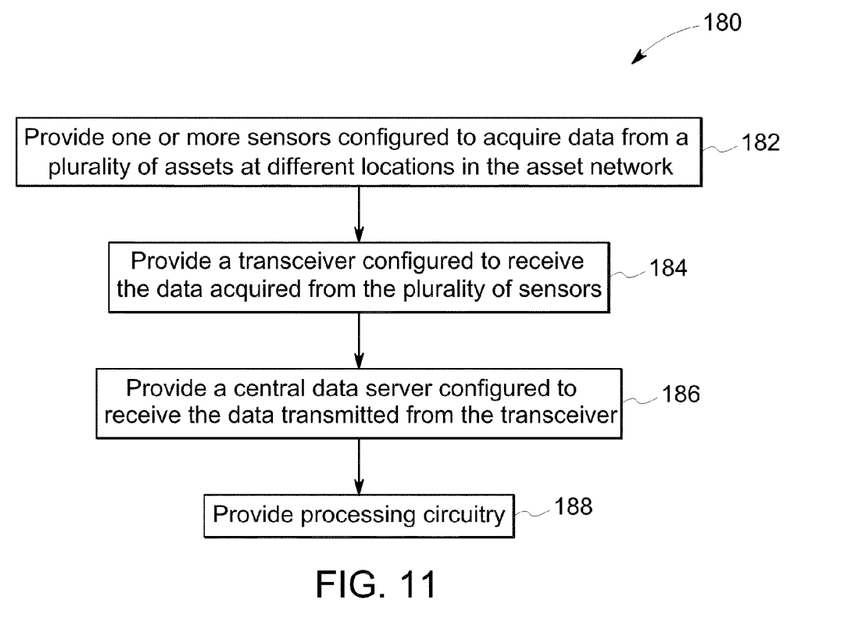
FIG. 11 is a flow chart representing steps involved in a method for providing a telematics system in an asset network in accordance with an embodiment of the invention.

FIG. 11 is a flow chart representing steps involved in an exemplary method 180 for providing a data analysis system in an asset network in accordance with an embodiment of the invention. The method 180 includes providing multiple sensors configured to acquire data from multiple assets at different locations in the asset network in step 182. In an embodiment of the invention, providing multiple sensors include providing one or more selective and preexisting sensors. A transceiver configured to receive the data acquired from the multiple sensors is provided in step 184. The method 180 also includes providing a central data server configured to receive data transmitted from the transceiver in step 186. In an embodiment, the central data server transmits the data to a processing circuitry provided in step 188. The processing circuitry is configured to combine the data from multiple assets at different locations in the asset network. Furthermore, a combined data is analyzed to detect trends in the asset network. Consecutively, value added services are generated based on the detected trends and distributed to multiple end users.

The various embodiments of a telematics system described above provide a telematics system including a data analysis system to provide value added services. The data analysis system includes a central data server configured to receive the data transmitted from the transceiver and a processing circuitry that combines data received from the central server, analyze combined data to detect trends in the asset network, generate value added services based on the detected trends and distribute the value added services to multiple end users. Thus, these techniques enable the multiple end users to plan trips, find preferred routes, collect real time information from remote locations and study different trends such as pollution levels, weather, traffic conditions, road conditions and wind patterns in the asset network.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a location sensor with respect to one embodiment can be adapted for use with a speed sensor described with respect to another embodiment of the invention to identify preferred rest stops on the highway. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A processing circuitry in an asset network, the processing circuitry configured to:
   combine data from a plurality of assets at different locations in the asset network;
   analyze combined data to detect trends in the asset network;
   generate value added services based on the detected trends; and
   distribute the value added services to a plurality of end users in the asset network.

2. The processing circuitry of claim 1, wherein the data is received via a central data server.

3. The processing circuitry of claim 1, wherein the central data server receives the data from a transceiver mounted on the plurality of assets.

4. The processing circuitry of claim 1, wherein the data comprises data acquired from a plurality of sensors mounted on the plurality of assets.

5. The processing circuitry of claim 4, wherein the plurality of sensors comprises one or more preexisting sensors and selective sensors.

6. The processing circuitry of claim 5, wherein the one or more selective sensors comprise radiation sensors, weather sensors and pollen sensors.

7. The processing circuitry of claim 5, wherein the one or more preexisting sensors comprise tire pressure sensors, location sensors and speed sensors.

8. The processing circuitry of claim 1, wherein the data comprises a real time data.

9. The processing circuitry of claim 1, further comprising an external data from an external data source is combined with the data from the plurality of assets at different locations in the asset network.

10. The processing circuitry of claim 1, wherein the value added services comprise environmental reports, road infrastructure status and conditions, traffic congestion reports at the different locations, commerce patterns, security conditions, amenities and preferences.

11. The processing circuitry of claim 1, wherein the trends comprise traffic congestion, road infrastructure, pollen count at a particular location, weather conditions and radiation detection.

12. A telematics system in an asset network comprising:
   a plurality of sensors configured to acquire data from a plurality of assets at different locations in the asset network;
   a transceiver configured to receive the data acquired from the plurality of sensors; and
   a data analysis system comprising:
      a central data server configured to receive the data transmitted from the transceiver; and
      a processing circuitry configured to:
      combine data received from the central server;
      analyze combined data to detect trends in the asset network;
      generate value added services based on the detected trends; and
      distribute the value added services to a plurality of end users in the asset network.

13. The system of claim 12, wherein the transceiver is mounted on the plurality of assets.

14. The system of claim 12, wherein the one or more sensors are mounted on the plurality of assets.

15. The system of claim 12, wherein the central data server receives the data from the transceiver mounted on the plurality of assets.

16. The system of claim 12, wherein the one or more sensors comprise one or more preexisting sensors and one or more selective sensors.

17. The system of claim 16, wherein the one or more selective sensors comprise radiation sensors, weather sensors and pollen sensors.

18. The system of claim 16, wherein the one or more preexisting sensors comprise tire pressure sensors and speed sensors.

19. The system of claim 12, wherein the data comprises a real time data.

20. The system of claim 12, further comprising an external data from an external data source is combined with the data from the plurality of assets at different locations in the asset network.

21. The system of claim 12, wherein the value added services comprise environmental reports, road infrastructure status and conditions, traffic congestion reports at the different locations, commerce patterns, security conditions, amenities and preferences.

22. A method of providing a telematics system in an asset network comprising:
   providing a plurality of sensors configured to acquire data from a plurality of assets at different locations in the asset network;
   providing a transceiver configured to receive the data acquired from the plurality of sensors;
   providing a central data server configured to receive the data transmitted from the transceiver; and
   providing a processing circuitry configured to:
      combine the data from a plurality of assets at different locations in the asset network;
      analyze combined data to detect trends in the asset network;
      generate value added services based on the detected trends; and;
      distribute the value added services to a plurality of end users in the asset network.

23. The method of claim 22, wherein providing the central data server comprises receiving data from the transceiver mounted on the plurality of assets.

24. The method of claim 22, wherein providing the plurality of sensors comprises providing one or more selective and preexisting sensors.

25. The method of claim 24, wherein providing the one or more selective sensors comprise providing radiation sensors, weather sensors and pollen sensors.

26. The method of claim 24, wherein providing the one or more preexisting sensors comprise tire pressure sensors, speed sensors and security sensors.

27. The method of claim 22, further comprising wherein combining the data comprises combining an external data from an external data source with the data from the plurality of assets at different locations in the asset network.

28. The method of claim 22, wherein generating the value added services comprises generating environmental reports, road infrastructure status and conditions, traffic congestion reports at the different locations, commerce patterns, security conditions, amenities and preferences.

29. A method for data analysis in an asset network comprising:

acquiring data from a plurality of sensors in the asset network;

combining the data acquired from the plurality of sensors;

analyzing a combined data to detect trends in the asset network;

generating value added services based on the detected trends; and distributing the value added services to a plurality of end users in the asset network.

30. The method of claim 29, comprising acquiring the data from different locations in the asset network.

\* \* \* \* \*